US010571140B2

(12) United States Patent
Dietz et al.

(10) Patent No.: US 10,571,140 B2
(45) Date of Patent: Feb. 25, 2020

(54) METHOD AND APPARATUS FOR PASSIVELY CONTROLLING AIRFLOW

(71) Applicants: Dennis R. Dietz, Bradenton, FL (US); John Robert Harrell, Bradenton, FL (US); Dwight Ray Shackelford, Sarasota, FL (US)

(72) Inventors: Dennis R. Dietz, Bradenton, FL (US); John Robert Harrell, Bradenton, FL (US); Dwight Ray Shackelford, Sarasota, FL (US)

(73) Assignee: American Aldes Ventilation Corporation, Bradenton, FL (US)

( * ) Notice: Subject to any disclaimer, the term of this patent is extended or adjusted under 35 U.S.C. 154(b) by 734 days.

(21) Appl. No.: 14/947,280

(22) Filed: Nov. 20, 2015

(65) Prior Publication Data

US 2016/0076784 A1   Mar. 17, 2016

Related U.S. Application Data

(60) Continuation of application No. 12/783,826, filed on May 20, 2010, now Pat. No. 9,201,428, which is a
(Continued)

(51) Int. Cl.
*F24F 7/06* (2006.01)
*F24F 11/00* (2018.01)
*G05D 7/06* (2006.01)

(52) U.S. Cl.
CPC ........ *F24F 11/0001* (2013.01); *G05D 7/0688* (2013.01); *Y10T 137/86944* (2015.04)

(58) Field of Classification Search
USPC ............... 454/237, 239, 256, 251–253, 284
See application file for complete search history.

(56) References Cited

U.S. PATENT DOCUMENTS

| 1,872,213 A | 8/1932 | Anderson et al. |
| 1,928,577 A | 9/1933 | Philip et al. |

(Continued)

FOREIGN PATENT DOCUMENTS

| DE | 3510388 | 10/1986 |
| EP | 1099912 | 5/2001 |

(Continued)

OTHER PUBLICATIONS

Aldes Engineered MPV Fan Systems 200 and 300, Central Exhaust Ventilator, Remote Mounted Bathroom Fan, American Aldes Ventilation Corporation, Sarasota, FL (Admitted Prior Art).
(Continued)

*Primary Examiner* — Vivek K Shirsat
(74) *Attorney, Agent, or Firm* — Jacox, Meckstroth & Jenkins

(57) ABSTRACT

A system and method for providing a substantially constant volume exhaust or ventilation air terminal system is shown for controlling exhaust and/or return airflow rates in a system having a central fan or ventilator. The system and method permits zone-by-zone or area-by-area airflow regulation or control in non-demand areas in response to a demand or call for ventilation in demand areas. In one embodiment, the system employs at least one constant airflow controller or regulator situated in a damper. Another embodiment shows a combination of a first constant airflow controller or regulator situated or mounted on a damper with a second constant airflow controller or regulator situated in a duct associated with the damper. In still another embodiment, a constant airflow controller or regulator is provided in a duct, and used in combination with a solid damper.

45 Claims, 11 Drawing Sheets

Related U.S. Application Data division of application No. 11/318,682, filed on Dec. 27, 2005, now Pat. No. 7,766,734.

(56) References Cited

U.S. PATENT DOCUMENTS

| | | | |
|---|---|---|---|
| 2,976,793 A * | 3/1961 | Cole | F24F 11/72 454/255 |
| 3,053,454 A | 9/1962 | Waterfill et al. | |
| 3,415,178 A | 12/1968 | Donald et al. | |
| 3,434,409 A | 3/1969 | Fragnito et al. | |
| 3,495,606 A | 2/1970 | Phillips et al. | |
| 3,506,038 A | 4/1970 | Perry et al. | |
| 3,554,112 A | 1/1971 | Herb et al. | |
| 3,595,475 A | 7/1971 | Morton et al. | |
| 3,653,588 A | 4/1972 | Dreibelbis et al. | |
| 3,719,321 A | 3/1973 | Mcnabney et al. | |
| 3,727,835 A | 4/1973 | Rifkin et al. | |
| 3,806,027 A | 4/1974 | Ginn et al. | |
| 3,884,133 A | 5/1975 | Miller | |
| 3,901,275 A | 8/1975 | Logsdon | |
| 3,926,101 A | 12/1975 | Moss | |
| 3,937,398 A | 2/1976 | Waeldner et al. | |
| 3,961,748 A | 6/1976 | McNabney | |
| 3,990,356 A | 11/1976 | Keller | |
| 3,993,096 A | 11/1976 | Wilson | |
| 4,019,566 A | 4/1977 | Cobb | |
| 4,058,253 A | 11/1977 | Munk et al. | |
| 4,062,400 A | 12/1977 | Horowitz | |
| 4,077,567 A | 3/1978 | Ginn et al. | |
| 4,118,209 A | 10/1978 | Exler et al. | |
| 4,120,453 A | 10/1978 | Herb et al. | |
| 4,155,289 A | 5/1979 | Garriss | |
| 4,175,401 A | 11/1979 | McManus | |
| 4,293,027 A | 10/1981 | Tepe et al. | |
| 4,324,358 A | 4/1982 | Tulowiecki et al. | |
| 4,353,409 A | 10/1982 | Saunders et al. | |
| 4,428,278 A | 1/1984 | Sutton, Jr. | |
| 4,477,020 A | 10/1984 | Makara | |
| 4,479,604 A | 10/1984 | Didner | |
| 4,489,881 A | 12/1984 | Dean et al. | |
| 4,497,242 A | 2/1985 | Moyer | |
| 4,515,308 A | 5/1985 | Jardinier et al. | |
| 4,714,010 A | 12/1987 | Smart | |
| 4,756,474 A | 7/1988 | Tulowiecki et al. | |
| 4,765,231 A | 8/1988 | Aniello | |
| 4,787,298 A | 11/1988 | Hon | |
| 4,805,835 A | 2/1989 | Schaus | |
| 4,903,894 A | 2/1990 | Pellinen et al. | |
| 4,944,216 A | 7/1990 | McCutchen | |
| 4,977,818 A | 12/1990 | Taylor et al. | |
| 5,003,865 A | 4/1991 | Traudt | |
| 5,131,887 A | 7/1992 | Traudt | |
| 5,160,292 A | 11/1992 | Parker | |
| 5,178,581 A | 1/1993 | Del Monte | |
| 5,205,783 A | 4/1993 | Dieckert et al. | |
| 5,220,910 A | 6/1993 | Aalto et al. | |
| 5,257,958 A | 11/1993 | Jagers | |
| 5,277,397 A | 1/1994 | Tartaglino | |
| 5,282,770 A | 2/1994 | Shibata | |
| 5,290,200 A | 3/1994 | Kiser | |
| 5,292,280 A | 3/1994 | Janu et al. | |
| 5,306,207 A | 4/1994 | Courts | |
| 5,332,151 A | 7/1994 | Kwak | |
| 5,406,977 A | 4/1995 | Barbarin et al. | |
| 5,449,319 A | 9/1995 | Dushane et al. | |
| 5,486,140 A * | 1/1996 | Abbott | F24F 13/20 138/107 |
| 5,673,851 A | 10/1997 | Dozier et al. | |
| 5,676,596 A | 10/1997 | Masek | |
| 5,788,571 A | 8/1998 | Ivison et al. | |
| 5,791,408 A | 8/1998 | Seem | |
| 5,862,982 A | 1/1999 | Federspiel | |
| 5,924,163 A | 7/1999 | Burns, Jr. | |
| 5,934,994 A | 8/1999 | Wylie et al. | |
| 5,976,010 A | 11/1999 | Reese et al. | |
| 6,009,894 A | 1/2000 | Trussart | |
| 6,071,188 A | 6/2000 | O'Neill et al. | |
| 6,071,189 A | 6/2000 | Blalock | |
| 6,102,793 A | 8/2000 | Hansen | |
| 6,126,540 A | 10/2000 | Janu | |
| 6,192,922 B1 | 2/2001 | MacGibbon et al. | |
| 6,273,136 B1 | 8/2001 | Steinert et al. | |
| 6,328,647 B1 | 12/2001 | Traudt | |
| 6,450,881 B2 | 9/2002 | Smith | |
| 6,473,668 B2 | 10/2002 | Abuzeid et al. | |
| 6,491,580 B2 | 12/2002 | Lemmon et al. | |
| 6,692,349 B1 * | 2/2004 | Brinkerhoff | F24F 7/00 454/256 |
| 6,698,219 B2 | 3/2004 | Sekhar et al. | |
| 6,699,119 B2 | 3/2004 | Boulanger et al. | |
| 6,749,125 B1 | 6/2004 | Carson et al. | |
| 6,843,264 B2 | 1/2005 | Chang et al. | |
| 6,945,278 B2 | 9/2005 | Bunn et al. | |
| 2006/0086814 A1 | 4/2006 | Helt et al. | |
| 2009/0258591 A1 * | 10/2009 | Carter | F24F 13/12 454/309 |

FOREIGN PATENT DOCUMENTS

| | | |
|---|---|---|
| FR | 2595453 | 9/1987 |
| GB | 2090966 | 7/1982 |

OTHER PUBLICATIONS

Aldes SV160 Multi-Port Bathroom Exhaust System, American Aldes Ventilation Corporation, Sarasota, FL (Admitted Prior Art)

Aldes Duct Fan, P-Series, In-Line Centrifugal Fan, Residential Applications/Supply or Exhaust, American Aides Ventilation Corporation, Sarasota, FL (Admitted Prior Art).

Aldes Constant Airflow Regulator (Model CAR), American Aides Ventilation Corporation, Sarasota, FL (Admitted Prior Art).

\* cited by examiner

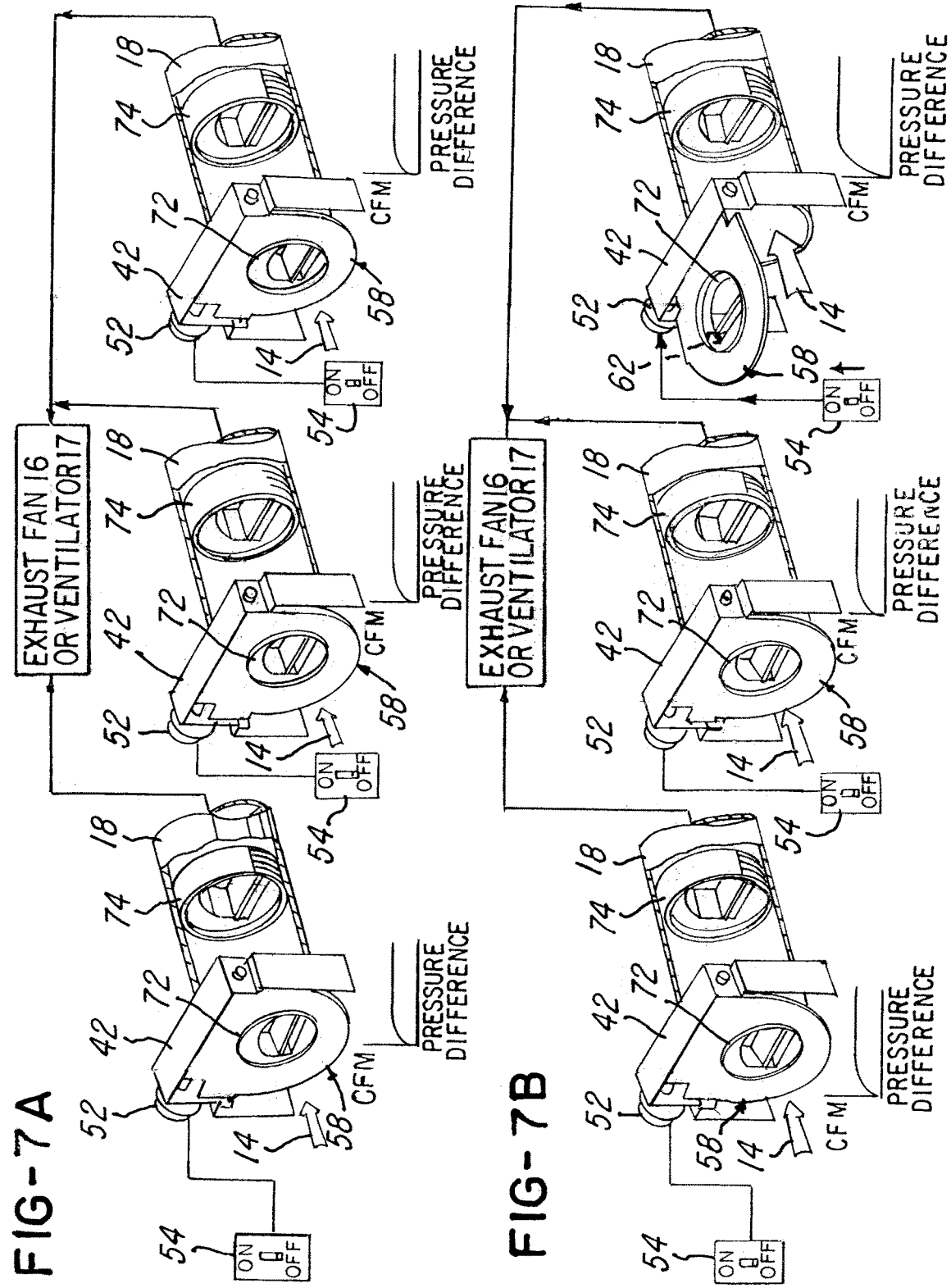

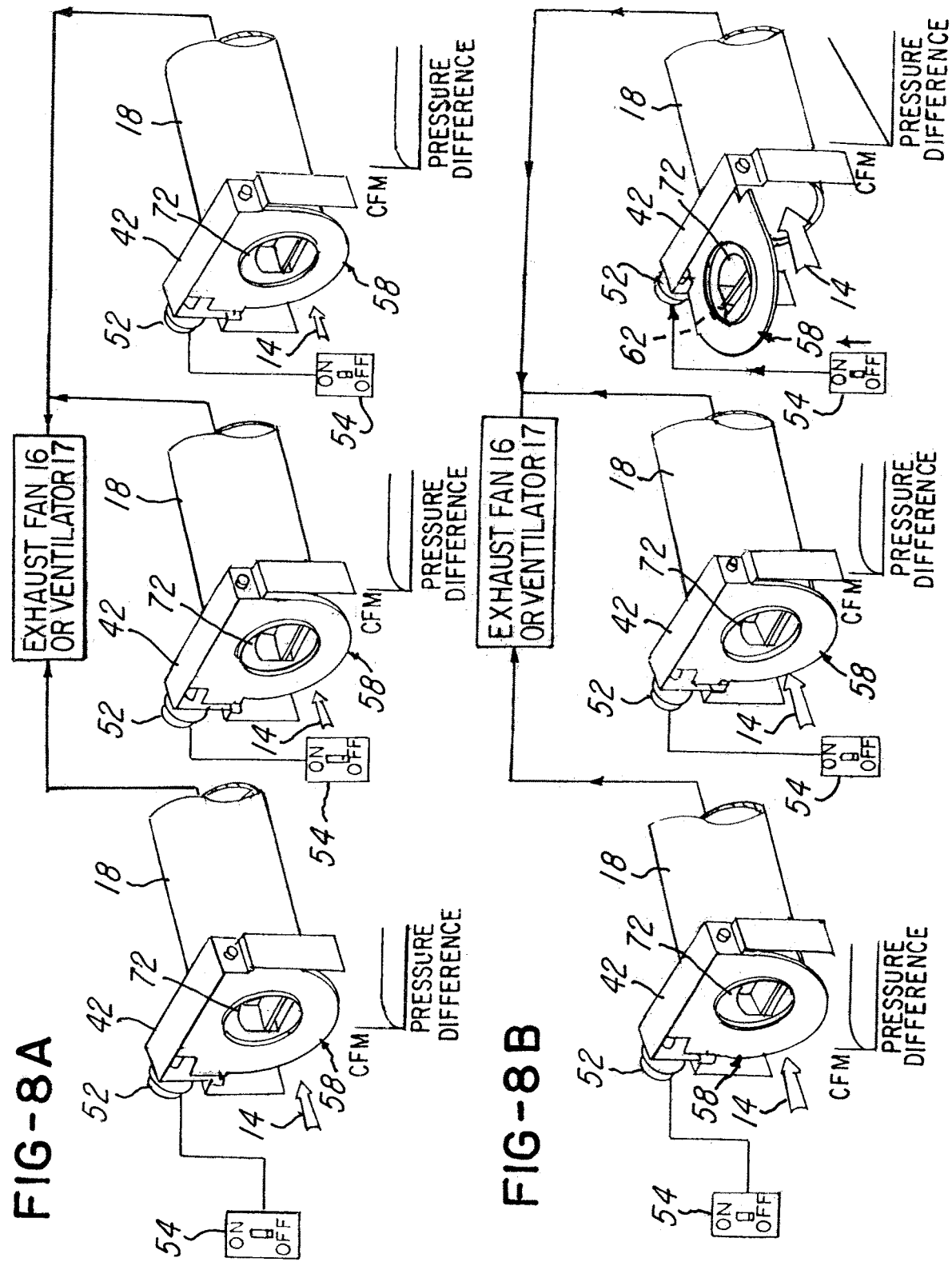

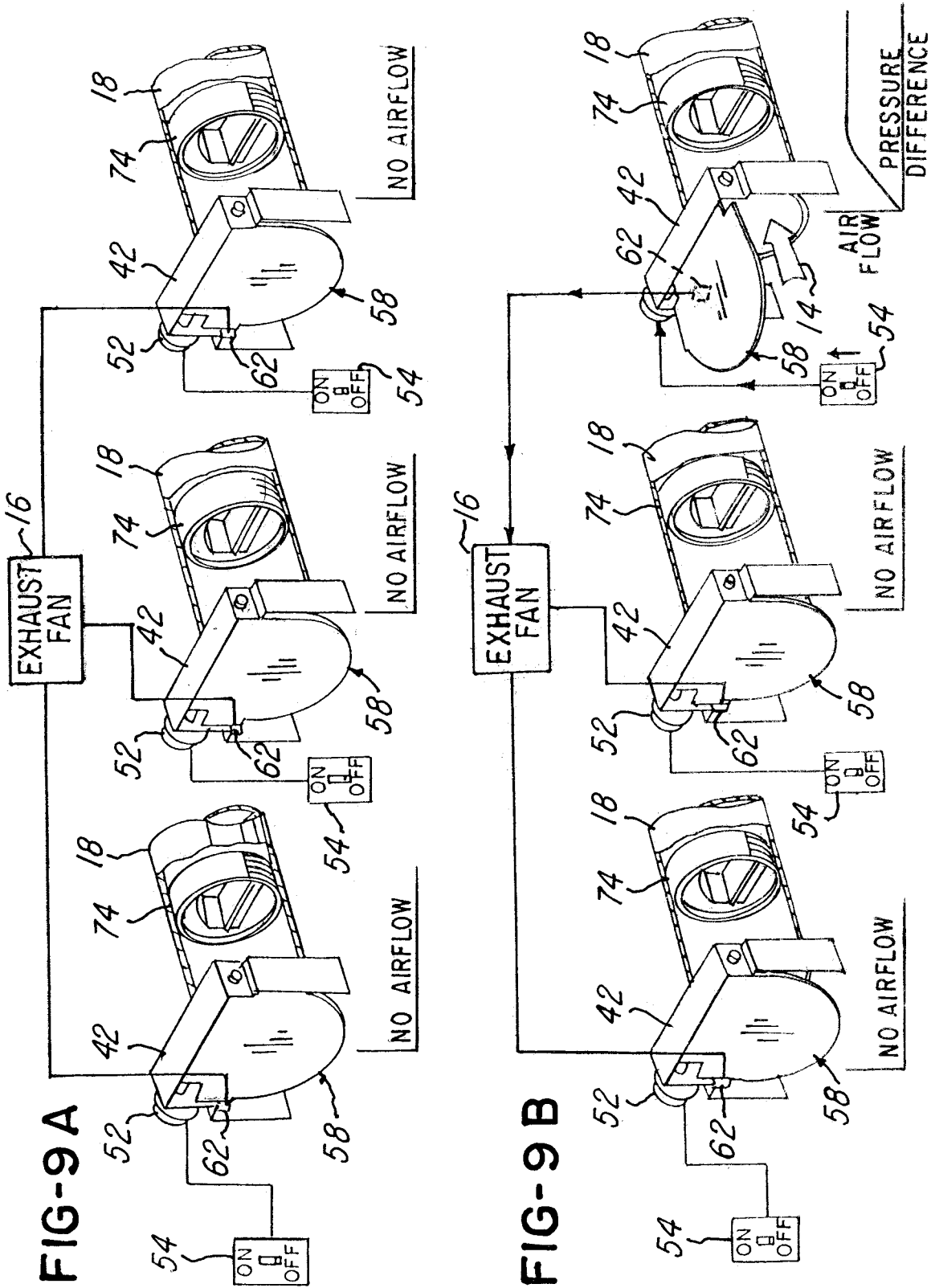

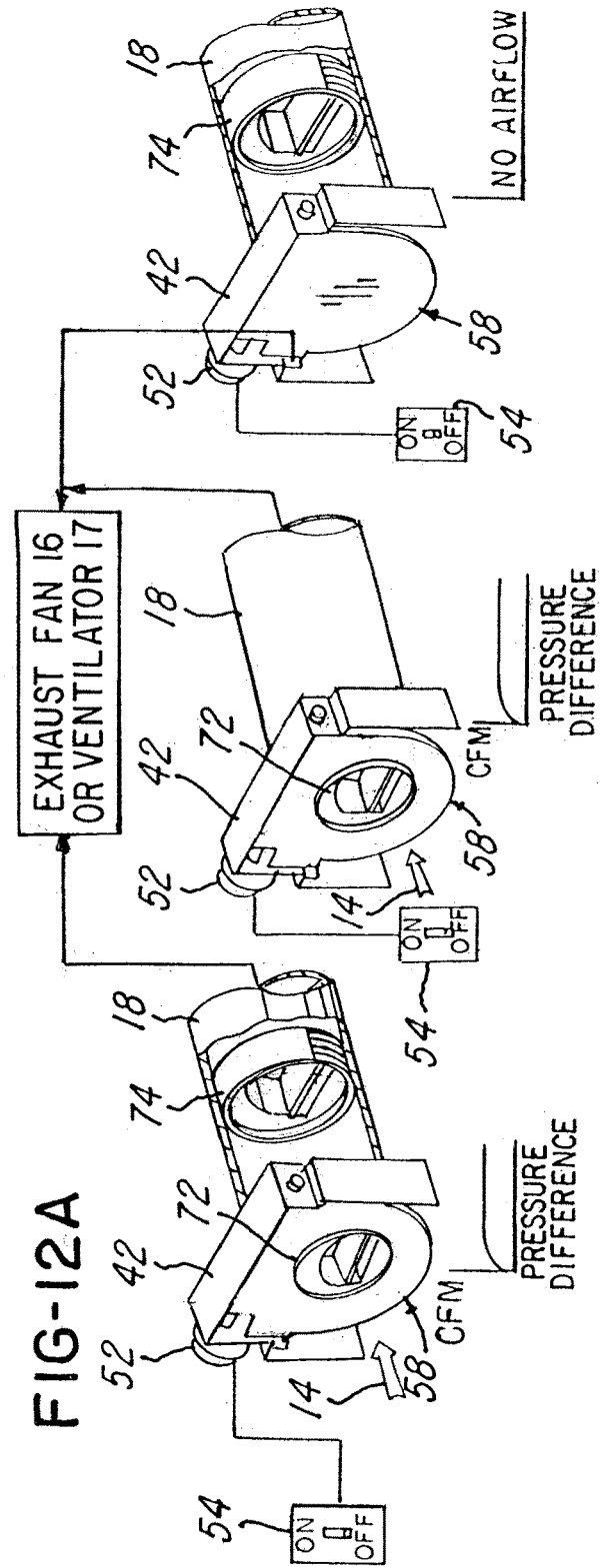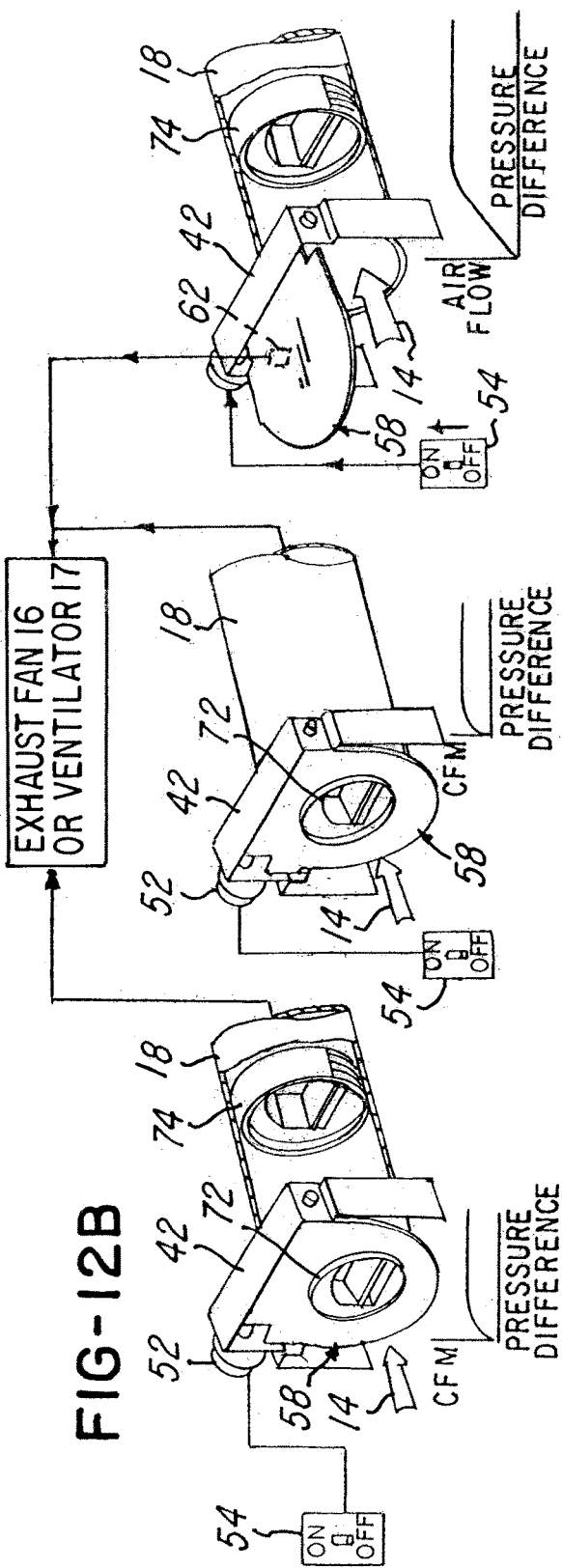

METHOD AND APPARATUS FOR PASSIVELY CONTROLLING AIRFLOW

CROSS-REFERENCE TO RELATED APPLICATIONS

This application is a continuation of U.S. patent application Ser. No. 12/783,826 filed May 20, 2010, issued as U.S. Pat. No. 9,201,428 on Dec. 1, 2015, which is a division of U.S. patent application Ser. No. 11/318,682 filed Dec. 27, 2005, issued as U.S. Pat. No. 7,766,734 on Aug. 3, 2010. These applications are incorporated herein by reference and made a part thereof.

BACKGROUND OF THE INVENTION

1. Field of the Invention

This invention relates to a method and apparatus for controlling airflow and, more particularly, a method and apparatus for controlling air distribution in fan assisted central exhaust and/or return air ventilating systems.

2. Description of the Related Art

Generally, central ventilation fans and ventilators used for the purpose of removing or exhausting air from areas in a building or structure, such as bathrooms, utility closets, kitchens in homes, offices, and other areas, will simultaneously remove air from fixed inlet terminals connected to the central ventilation fan whenever the fan is operating. Whether the fan operates intermittently or continuously, this results in excessive energy consumption as a result of removing heated and conditioned air from spaces that may not require ventilation simply because the demand for ventilation exists in one or more of the areas.

Previous attempts to limit a central fan or ventilation system to ventilating only occupied areas by opening and closing terminal devices, caused fluctuations in duct air pressure, and ultimately caused a shift in the amount of air removed or delivered to one or more of the areas or zones. This resulted in excessive ventilation rates and excessive energy usage in some areas and under-ventilating other areas, which in turn, caused poor indoor air quality related problems and a failure to meet minimum building code requirements in some instances.

Controlling the central fan speed or revolution per minute (RPM) to prevent the over or under-ventilation problem in zoned systems has been difficult, expensive and generally ineffective in the past. The typical fan control method involved monitoring either main duct pressure or the number of open zones to determine the total amount of airflow needed. However, a problem remained in that controlling the total system airflow does not ensure proper and/or constant airflow amounts at each zone branched duct.

Moreover, controlling airflow rates at each zone or branched duct in a supply air system has been accomplished using variable air volume (VAV) terminals. These VAV terminals were designed to vary the airflow rates in response to temperature needs. While VAV terminals have the capability to control airflow at constant levels, they typically utilized an electrically or pneumatically powered control device that monitors duct pressure through a pitot tube and sends a signal to a separate zone damper. These control devices required a separate power source, separate parts, and direct coupling to, among other things, a damper actuator to allow for responsive zoned airflow control. If the VAV control device loses power, it will also lose it ability to control airflow.

What is needed, therefore, is a system and method for controlling air distribution in both fan assisted central exhaust systems and/or return air ventilating systems that facilitates overcoming one or more of the problems of the prior art.

SUMMARY OF THE INVENTION

It is therefore an object of one embodiment of the invention to provide a ventilation terminal system and device with an integral primary zone controlled damper that regulates airflow in response to a switch, dehumidistat, light sensor, motion sensor, $CO^2$ sensor or the like.

An object of another embodiment is to provide a ventilation terminal device and system with a pressure independent flow control device that is integral to the primary flow control, which in one embodiment may be a damper.

Another object of another embodiment of the invention is to provide a flow control device and system that regulates airflow to substantially constant levels when exposed to varying duct pressures.

Still another object of another embodiment of the invention is to provide a flow control device and system that is mechanically removed from an airflow stream when the primary control device is caused to permit airflow to a predetermined demand level.

Still another object of another embodiment of the invention is to provide a control device for situating in an airflow stream to regulate or control airflow to a substantially constant or predetermined maximum rate.

Yet another object of another embodiment is to provide a system and method having a first control device that controls or regulates flow to a first substantially constant or predetermined rate, while another flow control device controls or regulates flow to a second predetermined level or rate.

Still another object of another embodiment of the invention is to provide at least one or a plurality of flow control devices that require no direct electric or pneumatic power source, but rather, utilize only system duct pressure to regulate airflow to first and/or second predetermined levels, respectively.

Still another object of another embodiment of the invention is to provide a minimum flow control device that will continue to operate if a primary flow control device cannot be actuated to permit increasing airflow or it loses power.

Still another object of another embodiment of the invention is to provide a ventilation control assembly and system that can be easily maintained and/or removed from a terminal housing without disconnecting the terminal to which the assembly is attached from any duct or ventilation shaft.

Still another object of another embodiment of the invention is to provide a system that is small enough to be mounted between floor, and/or ceiling assemblies, such as assemblies constructed of nominal 10" joists on 16" centers.

Another object of another embodiment of the invention is to provide an assembly that utilizes a damper drive-motor powered by 120 volt, 24 volt, 12 volt, or 220 volt AC or other suitable electrical voltage supply.

Yet another object of another embodiment of the invention is to provide a device that reduces or eliminates the need for routine maintenance of the type that is required by mechanical or electrical systems of the past.

Still another object of another embodiment of the invention is to provide a device that can be easily mounted in a fire or non-fire rated ceiling or wall assembly.

Yet another object of another embodiment of the invention is to provide a device that will reduce the necessary central fan horsepower requirements and will facilitate saving on energy consumption by reducing the overall fan or ventilator requirements in the system.

In one aspect, an embodiment of the invention comprises a zone control exhaust terminal comprising a housing having a first opening coupled to a duct and a second opening associated with an area to be ventilated, the housing directing airflow from the inlet to the outlet along a predetermined path and a damper hingeably coupled to the housing for controlling airflow between the area and a fan or ventilator, a motor for driving the damper from a closed position at which the damper becomes situated in the predetermined path and an open position at which the damper permits airflow along the predetermined path in response to a motor control signal and an airflow regulator situated in the predetermined path, the airflow regulator regulating airflow along the predetermined path when the damper is in the closed position.

In another aspect, another embodiment of the invention comprises a zone control ventilation system for use in a building having a plurality of areas to be ventilated, the system comprising at least one fan unit for generating airflow, a plurality of ducts coupled to at least one fan unit; a plurality of zone control exhaust terminals coupled to each of the plurality of ducts, respectively, and operatively associated with each of the plurality of areas each of the plurality of zone control exhaust terminals comprising a housing having an inlet coupled to a duct and an outlet associated with at least one of the plurality of areas to be ventilated, a damper pivotally coupled to the housing, a motor for driving the damper between a closed position and an open position at which the damper permits airflow between at least one fan unit and at least one plurality of areas and into at least one of the plurality of areas to be ventilated in response to a motor control signal, and an airflow regulator situated in an airflow path, the airflow regulator for regulating an airflow rate along the airflow path between the room and at least one fan unit In another aspect, another embodiment of the invention comprises a method for maintaining a substantially constant airflow in a ventilation system having a plurality of ducts, the method comprising the steps of passively regulating airflow at a first rate through the plurality of ducts and causing airflow through at least one of the plurality of ducts at a second rate in response to a demand signal as the airflow through the other of the plurality of ducts continues to flow at the first rate.

In yet another aspect, another embodiment of the invention comprises a method for controlling airflow through a plurality of ducts coupled to a ventilator, comprising the steps of permitting airflow from the ventilator through at least one of the plurality of ducts at a substantially constant rate and permitting airflow through at least one of the plurality of ducts to an area at a demand rate that is greater than the substantially constant rate in response to a demand signal.

In still another aspect, another embodiment of the invention comprises a method for providing zone-by-zone airflow regulation for regulating airflow to substantially constant levels, comprising the steps of controlling airflow substantially constant through a plurality of terminals associated with areas where no ventilation airflow is demanded at a first rate and controlling airflow through said terminal at a second rate, which is higher than said first rate in areas where ventilation airflow is demanded in response to an airflow demand at a demand rate.

In yet another aspect, another embodiment of the invention is to provide a method for regulating airflow to a plurality of zones of a building having a fan, comprising the steps of situating a primary regulator in operative relationship with each of said plurality of zones to regulate airflow between each of said plurality of zones and said fan and situating at least one constant airflow regulator in operative relationship with each of said primary regulators in order to regulate airflow between each of said plurality of zones and said fan such that when said primary regulator permits a demand airflow between one of said plurality of zones and said fan, said at least one constant airflow regulators control or regulate airflow such that airflow to at least the other of said plurality of zones is substantially constant.

In still another aspect, another embodiment of the invention is to provide a method for regulating airflow to a substantially constant level in each of a plurality of zones in a structure, said structure comprising an airflow generator and at least one conduit for providing fluid communication between each of said plurality of zones and said airflow generator and said method comprising the steps of causing airflow to a demand level in any of said plurality of zones where airflow to said demand level is demanded and regulating airflow to a substantially constant level in the other of said plurality of zones where airflow to a demand level is not demanded.

In yet another aspect, another embodiment of the invention comprises a system for regulating airflow in a structure having a plurality of zones and said system comprising an airflow generator and a plurality of terminals associated with each of said plurality of zones, respectively a conduit for coupling said airflow generator to each of said plurality of terminals a plurality of primary regulators coupled to said plurality of terminals, respectively, for causing airflow to a demand level in one of said plurality of zones in response to a demand and a plurality of first constant airflow regulators situated between each of said plurality of zones, respectively, and said airflow generator to regulate airflow between said airflow generator and those other plurality of zones where demand airflow is not demanded to a first predetermined level.

In another aspect, another embodiment comprises a damper assembly for use in a ventilation system having an airflow generator, a terminal associated with an area to be ventilated, and a duct for coupling the airflow generator to the terminal, the damper assembly comprising: a support, a damper pivotally coupled to one support, a motor mounted on the support for driving said damper between a closed position and an open position and the damper assembly being detachably secured and removable from the system without dismantling or disconnecting either the duct or the terminal.

These are illustrative objects. Other objects and advantages of the invention will be apparent from the following description, the accompanying drawings and the appended claims.

BRIEF DESCRIPTION OF ACCOMPANYING DRAWINGS

FIGS. 7A-7B illustrate one embodiment of the invention and also illustrates a plurality of airflow versus pressure difference characteristic curves relative to the airflow in each of the ducts illustrated;

FIGS. 8A-8B is a view of another embodiment of the invention illustrating a airflow controller or regulator situated in the damper and associated curves, but with no airflow controller or regulator situated in any of the ducts;

FIGS. 9A-9B illustrate another embodiment of the invention, illustrating a system having a plurality of solid dampers, each of which comprise an associated constant airflow controller or regulator situated in a duct associated with each damper;

Figure 4:
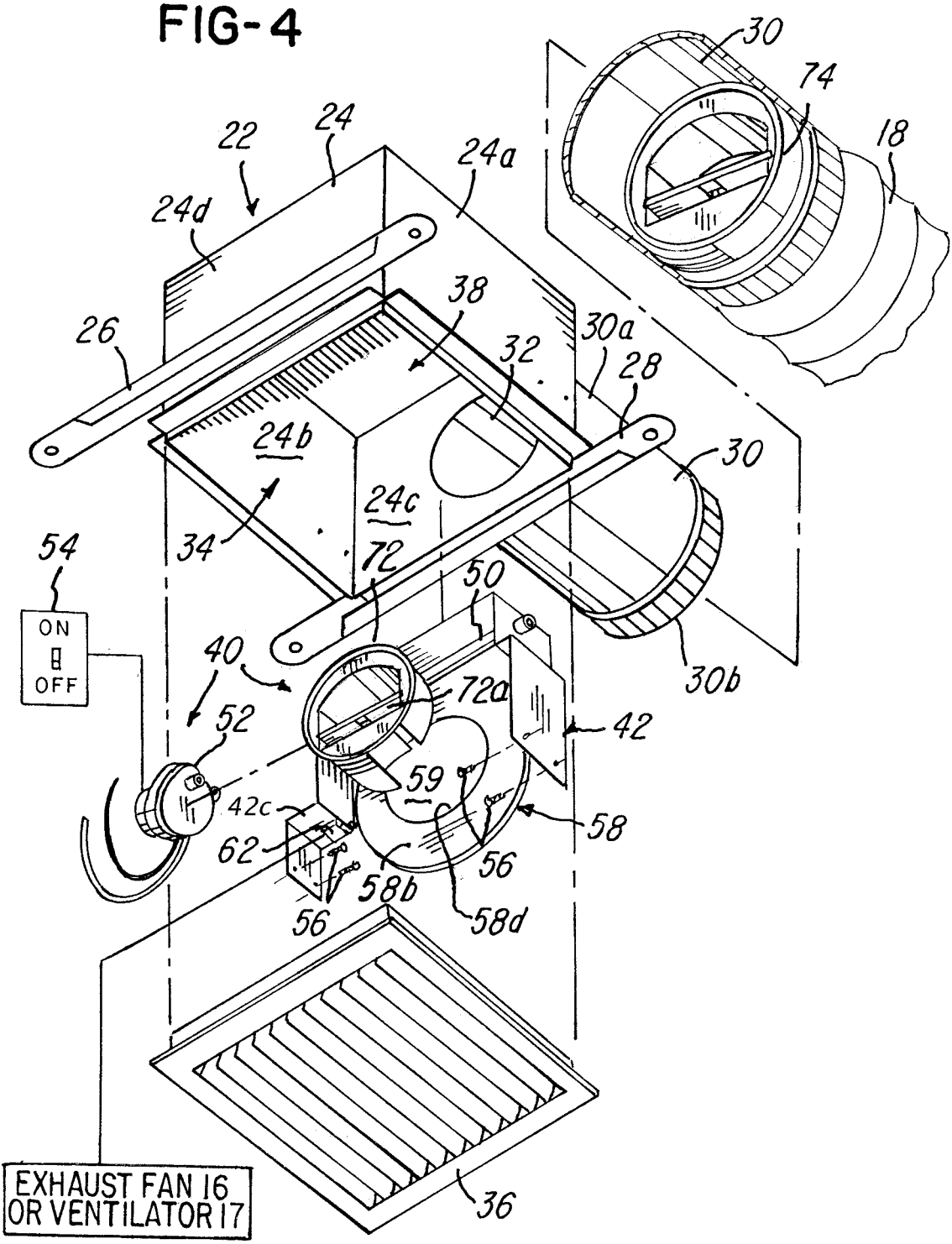
FIG. 4 is an exploded view of an embodiment illustrating, among other things, a housing, the ventilation duct, and a plurality of constant air controllers or regulators.
Figure 5:
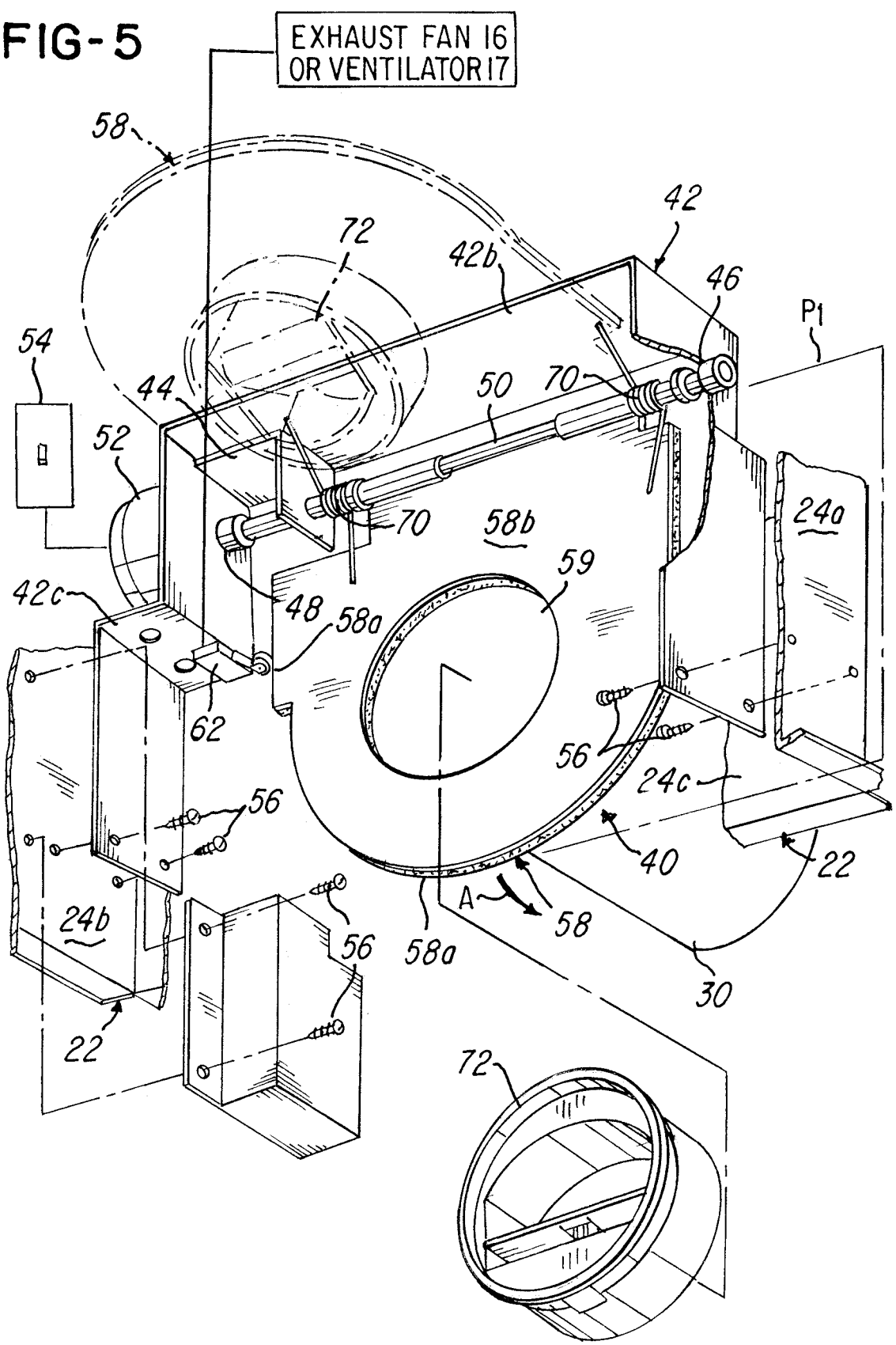
FIG. 5 is a fragmentary and sectional view illustrating various features of the embodiment shown in FIG. 4 and also illustrating a damper having an aperture for receiving an airflow controller or regulator and also showing the damper in phantom after the airflow controller or regulator has been received in the aperture and the damper has been actuated by the drive motor to an open position.
Figure 11:
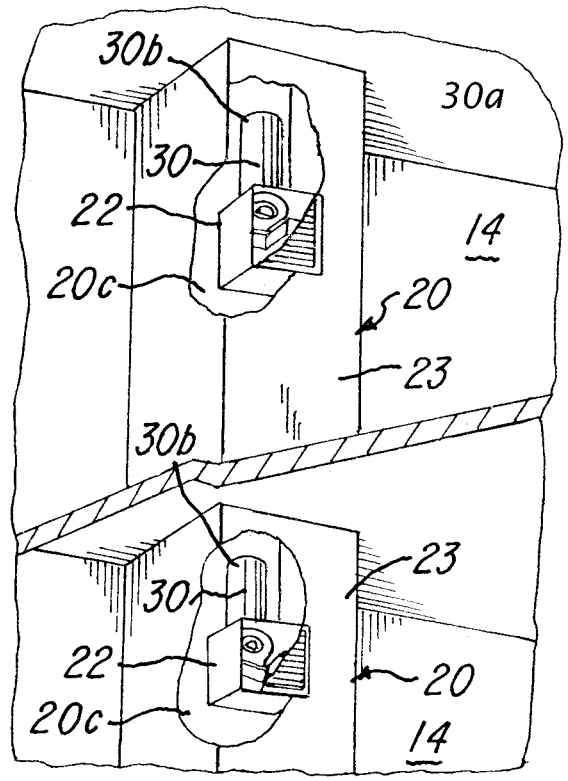

FIG. 11 illustrates the use of a terminal of the type shown in FIGS. 4 and 5 mounted in a central pressurized shaft and further illustrating an open duct associated with the housing of the terminal open to the pressure in the central shaft; and FIGS. 12A-12B illustrate another embodiment of the invention where various combinations of features of a primary, secondary, and tertiary control or regulators may be used in various combinations, with the embodiment shown in FIGS. 12A-12B being a representative example.

DETAILED DESCRIPTION OF THE PREFERRED EMBODIMENTS

Figure 1:
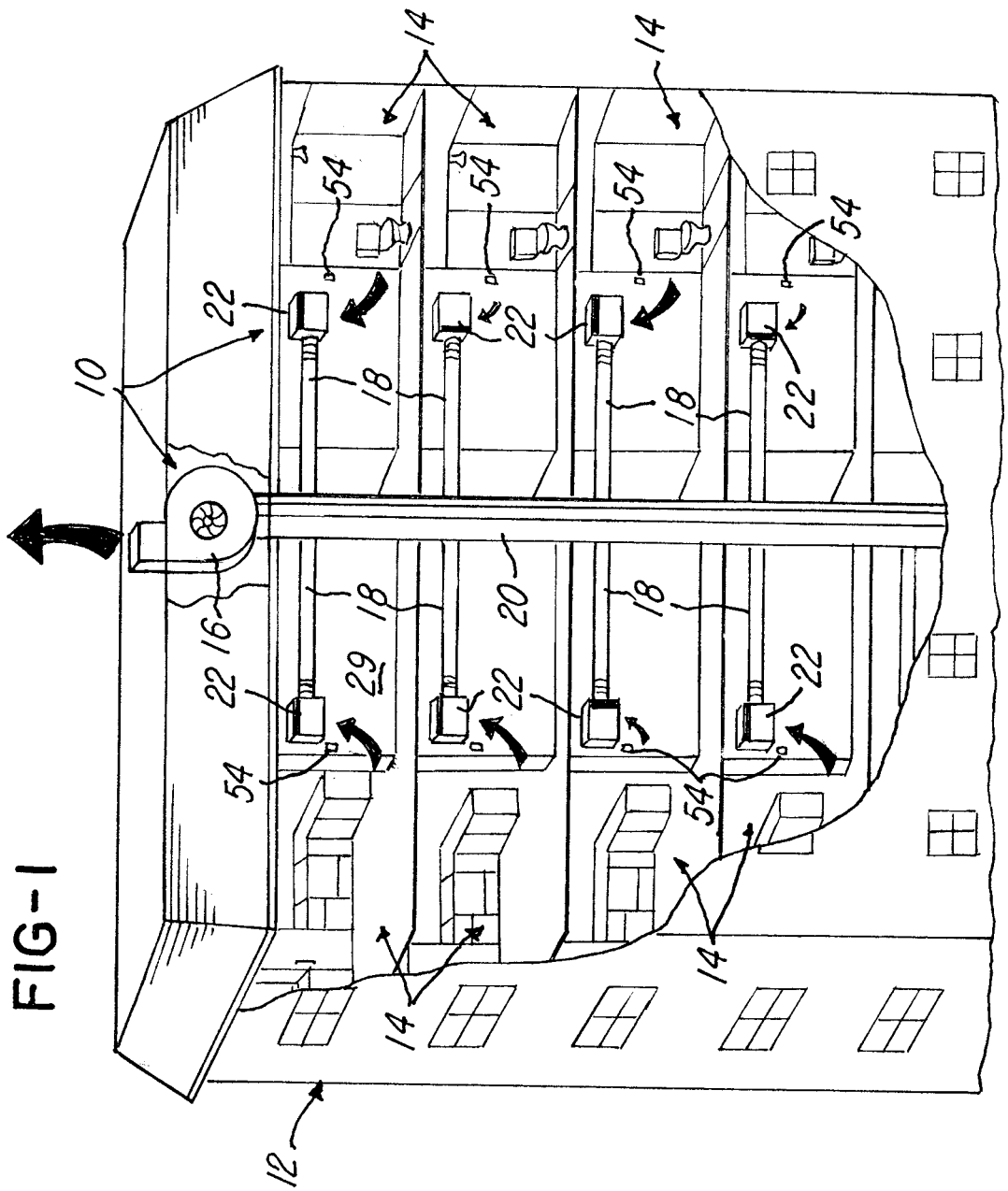
FIG. 1 is a perspective view showing an embodiment of the invention, illustrating the use of a fan or ventilator in combination with a central shaft in combination with one or more terminals associated with each area or zone to be ventilated.
Figure 2:
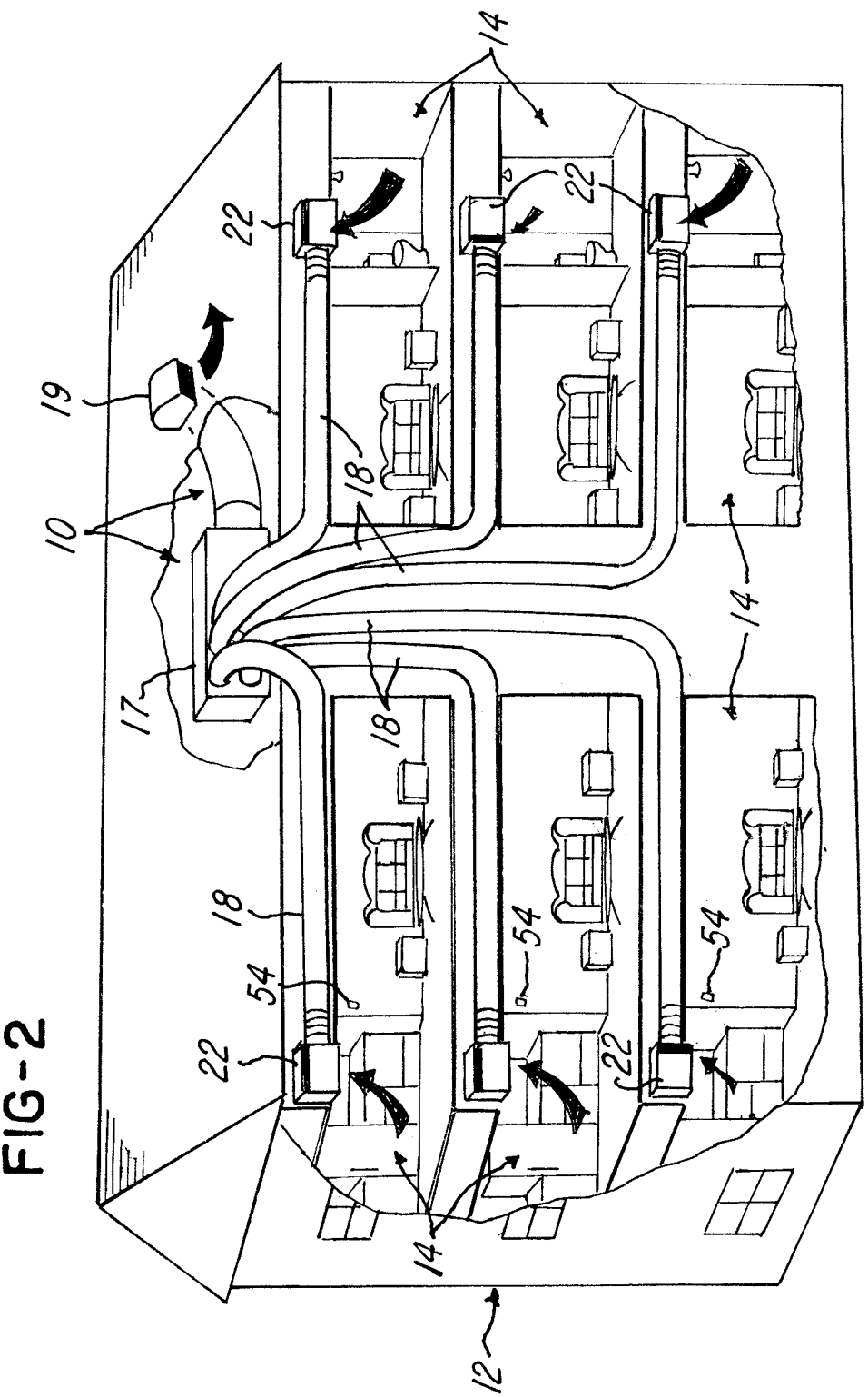
FIG. 2 is a fragmentary view of another embodiment of the invention showing a system utilizing a ventilator in combination with one or more terminals.
Figure 3:
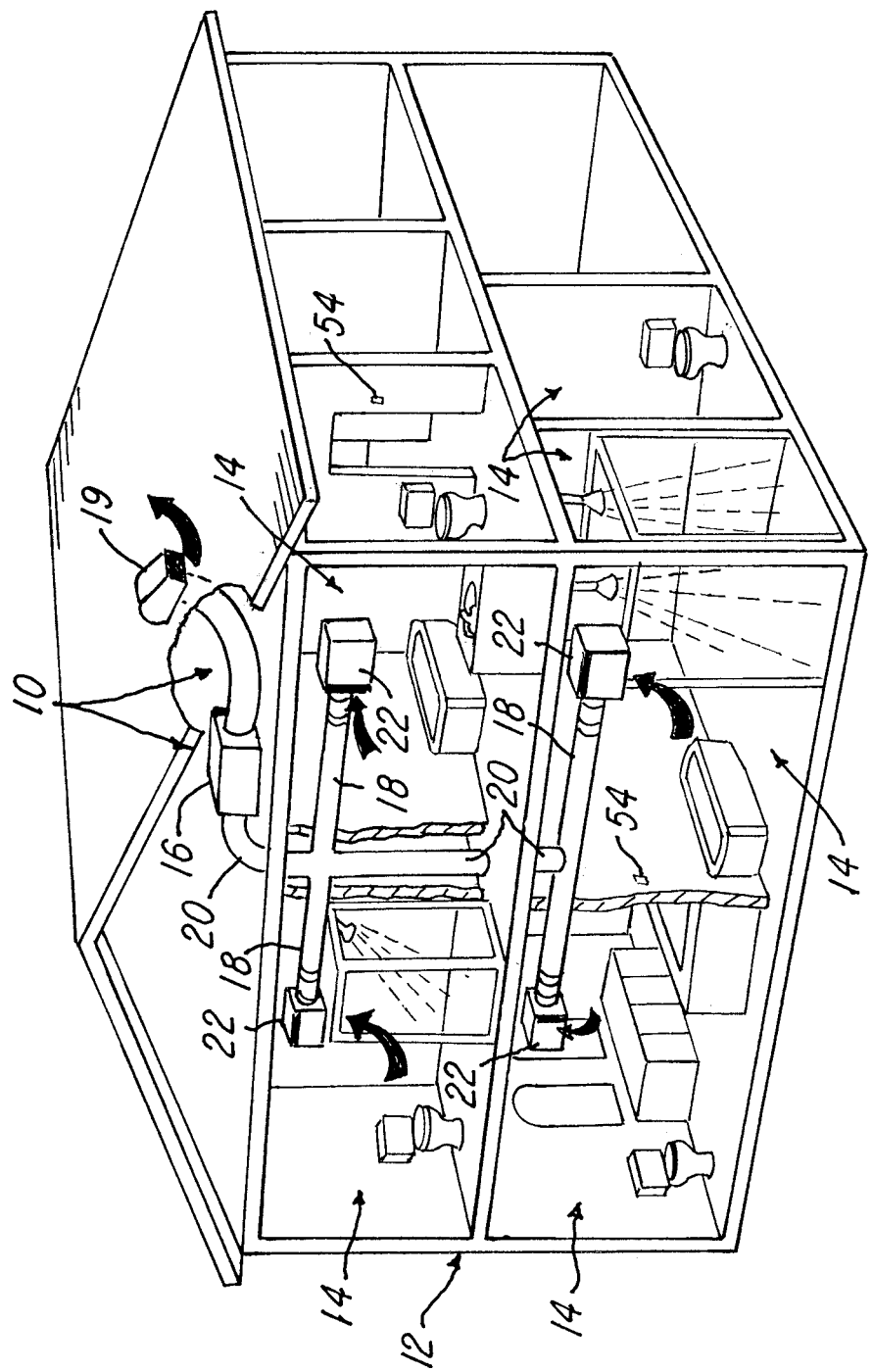
FIG. 3 is a fragmentary view of a variable fan ventilation or exhaust system in accordance with one embodiment of the invention.

Referring now to FIGS. 1-3, a zone control ventilation system or passive flow control system 10 for use in the building 12, such as a multi-story commercial building (FIG. 1), multi-story condominium or apartment building (FIG. 2), a residential building (FIG. 3). The system 10 provides a system, apparatus and method for providing on-demand airflow at a demand airflow rate and a passive airflow at a passive airflow rate to a plurality of zones or areas 14 in the manner described later herein.

The system 10 comprises at least one fan 16 (FIGS. 1 and 3), or the system 10 may comprise a ventilator 17, such as one or more of the multi-port ventilator series ("MPV") model series MPV ventilator provided by American Aldes Ventilation Corporation of Sarasota, Fla. It should be understood that other suitable ventilators or fans may be used and the invention is not limited by these particular model types.

The system 10 further comprises a plurality of ducts 18 that are coupled directly to the at least one fan 16 or ventilator 17, as illustrated in FIGS. 2 and 3, or coupled to a main ventilation duct or shaft 20 (FIGS. 1 and 11) that is coupled to either the at least one fan 16 or ventilator 17. The plurality of ducts 18 are each coupled to at least one or a plurality of zone control exhaust terminals 22, at least one of which is operatively associated with each of the areas 14 to be ventilated. Although the embodiments illustrated in FIGS. 1-3 show a single zone control exhaust terminal 22 associated with each of the areas 14, it should be understood that more than one of the plurality of zone control exhaust terminals 22 may be associated with each of the areas 14. Although not shown, not every area or zone 14 in the building, structure or residence 12 must have one or more of the plurality of zone control exhaust terminals 22, although in a preferred embodiment at least one of the plurality of zone control exhaust terminals 22 is associated with each area 14.

Also, while the illustration shown in FIG. 2 shows a multi-port ventilator 17 coupled directly to each of the plurality of zone control exhaust terminals 22 via ducts 18, the zone control exhaust terminals 22 may be coupled directly to the main ventilation shaft 20 or to artery ducts, such as ducts 18 (FIG. 1), that extend from the main ventilation shaft 20. Alternatively, as illustrated in FIG. 11, the terminal 22 may be situated interior of the shaft, with an open duct extension 30, which in one embodiment is at least 22 inches. Note that the duct extension 30 has an end 30a coupled to the terminal 22 and an end 30b that is open to the interior area 20c of shaft 20. It should be understood that the interior area 20c of shaft 20 has an interior pressure created or provided by the at least one fan 16 or ventilator 17.

Figure 6:
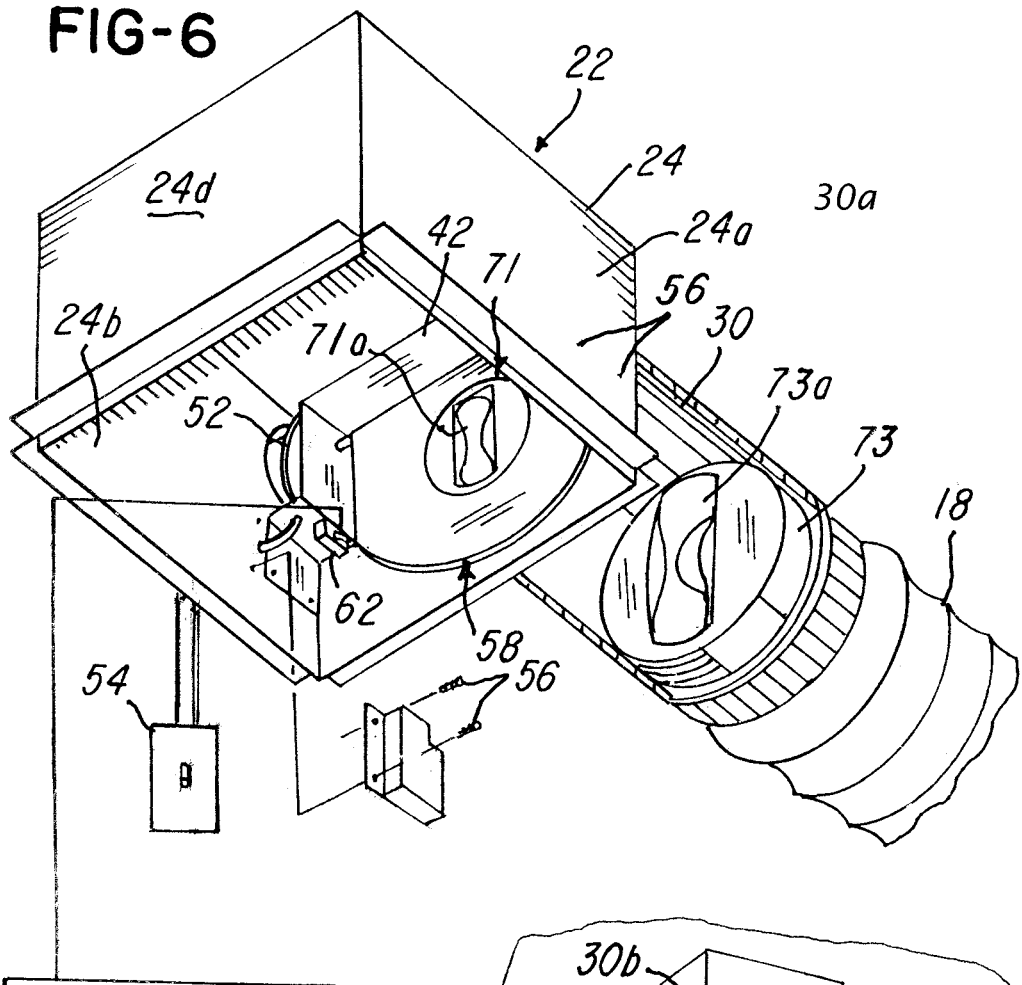
FIG. 6 is an assembled view of the embodiments illustrated in FIGS. 4 and 5.

Referring to FIGS. 4-6, various details of one of the plurality of zone control exhaust terminals 22 will now be described. It should be understood that each of the plurality of zone exhaust terminals 22 comprise substantially the same parts, although they do not have to be identical to each other as will become apparent later herein. Each of the zone control exhaust terminals 22 comprises a box-shaped housing 24 having a plurality of flanges 26 and 28. The flanges 26 and 28 provide means for mounting the housing 24 to a structure, such as between adjacent 10" joists or trusses on 16" or 22" centers in a ceiling or roof of the building 12 or between adjacent studs (not shown) in a wall 29 (FIG. 1) of the building 12, or to a wall 23 (FIG. 11) of shaft 20.

As illustrated in FIGS. 4 and 6, the housing 24 is generally rectangular and comprises the duct extension or collar 30 for coupling the housing 24 to duct 18 and for communicating with an opening 32 into an area 34 defined by the housing 24. The duct collar 30 is conventionally coupled to the duct 18 as illustrated in FIG. 6. As mentioned earlier, however, terminal 22 could be mounted to shaft 20 and the end 30b of duct collar 30 could be open to the interior area 20c of central shaft 20. The housing 24 further comprises a grille or cover 36 for covering a second opening 38 of the housing 24. The second opening 38 is associated or in communication with the area or zone 14.

The system 10 further comprises an air restrictor or damper assembly 40 which will now be described relative to FIG. 5. The assembly 40 comprises a generally U-shaped frame or housing 42 having an L-shaped bracket 44 welded or secured thereto. The apertures 46 and 48 typically support and receive a drive shaft 50 which is coupled to and pivotally driven by a motor 52 that is operatively coupled to a switch 54 as shown. The switch 54 may be a wall switch situated on, for example, the wall, such as a wall 29 in FIG. 1, associated with the area 14. The switch 54 may be a manual wall switch actuated by a user, or the motor 52 may be coupled and respond to at least one of a motion sensor, manual control, timer mechanism, light sensor, occupancy sensor, $CO^2$ sensor or other indicators or sensors of presence when a user enters or exits one of the areas 14.

The generally U-shaped support, member bracket 42 is received in the area 34 (FIG. 4) of housing 24 and secured between housing walls 24a and 24b with a plurality of screws 56 as shown. Note that the assembly 40 further comprises a primary flow control, which in the illustration is a damper 58 that is secured by a weld, screws or other suitable means to the drive shaft 50 of motor 52. The damper 58 is pivotally driven by the motor 52 in response to a user actuating the switch 54, for example, from an off position to an on position. It should be understood that the motor 52 is operatively coupled to a power source, an AC power source (not shown) in one embodiment, such as a 12V, 24V, 120V or 220V AC, but a DC power source may also be used. When the switch 54 is actuated by a user to the on position, the motor 52 becomes energized and pivotally drives the damper 58 from the closed position to the open position illustrated in phantom in FIG. 5.

It should be noted that the damper 58 is operatively associated with and situated adjacent to an opening 32 (FIG. 4) in the wall 24c of housing 24. A first side 58a of damper 58 may comprise a foam or other sealing material secured thereto by an adhesive for sealing the damper against the surface 24c of housing 24 when the damper 58 is in the closed position illustrated in FIG. 6. Note that the assembly 40 comprises a spring or plurality of springs 70 that act upon a joining portion 42b of the generally U-shaped support 42 and on the surface 58b of damper 58 to urge or bias the damper 58 in the direction of arrow A in FIG. 5 so that the damper 58 is biased in the closed position illustrated in FIG. 6. The motor 52 retains the damper 58 in the open position during any demand period, which is the period in time that the motor 52 is being activated.

In one embodiment shown in FIGS. 4, 5 and 9A-9B, the assembly 40 may further comprise a switch 62 that is mounted on a flat area or ledge 42c of generally U-shaped bracket 42 as illustrated in FIGS. 4 and 5. The switch 62 is operatively coupled to the at least one exhaust fan 16 or ventilator 17 such that when the damper 58 is actuated or driven from the closed position illustrated in FIG. 6 to the open position (shown in phantom in FIG. 5), a first side 58a of damper 58 actuates the lever or switch 62 coupled to the power source (not shown). When the switch 62 is triggered, the exhaust fan 16 or ventilator 17 becomes energized in response, thereby causing an increase of airflow in the ducts 18 or shaft 20. When the damper 58 returns to the closed position, for example, when the user activates switch 54 to the off position, the damper 58 in the embodiment shown FIGS. 9A and 9B is driven or actuated to the closed position to close the opening 32 and release the switch 62 to cause at least one fan 16 or ventilator 17 to turn off.

One feature and advantage of this design illustrated in FIGS. 4-5 is that it is easy to perform maintenance on or remove the assembly 40 after it is installed, although it is not believed that much maintenance will be required.

Returning to FIGS. 9A-9B, an embodiment is illustrated where the ventilator 17 or at least one fan 16 is only on when the user actuates the switch 54 to the on position. In contrast, the embodiments illustrated in FIGS. 7A-7B and FIGS. 8A-8B, described later herein, does not utilize switch 62 to activate at least one fan 16 or ventilator 17. In these embodiments, at least one fan 16 or ventilator 17 provide a constant airflow in the ducts 18, 19 or shaft 20. However, when a damper 58 in the system 10 is opened in these illustrative embodiments, at least one fan 16 or ventilator 17 responds to a decrease in duct system resistance or demand for increased airflow and automatically causes an increase in fan or ventilator speed, thereby causing a resultant increase in the airflow in the shaft 20 and ducts 18 in response and in a manner conventionally known.

Referring to FIGS. 4-6, the assembly 40 further comprises at least one or a plurality of airflow regulators 71 and 73 (FIG. 6) and/or 72 and 74 (FIGS. 1-5). In one embodiment, the airflow regulators 71 and 73 are integral constant dynamic airflow regulators, such as the constant airflow regulators CAR I and CAR II available from American Aldes Ventilation Corporation, 4537 Northgate Court, Sarasota, Fla. 34234-2124. As illustrated in FIGS. 4 and 5, note that the damper 58 comprises an aperture or opening 59 defined by the interior area as shown. The diameter of the interior wall 58d in damper 58 is dimensioned to receive the airflow regulator 72 as shown. As illustrated, bulb-type constant airflow regulators, such as those regulators 71 and 73 illustrated in FIG. 6, may be used and these are also available from American Aldes Ventilation Corporation.

Figure 10A:
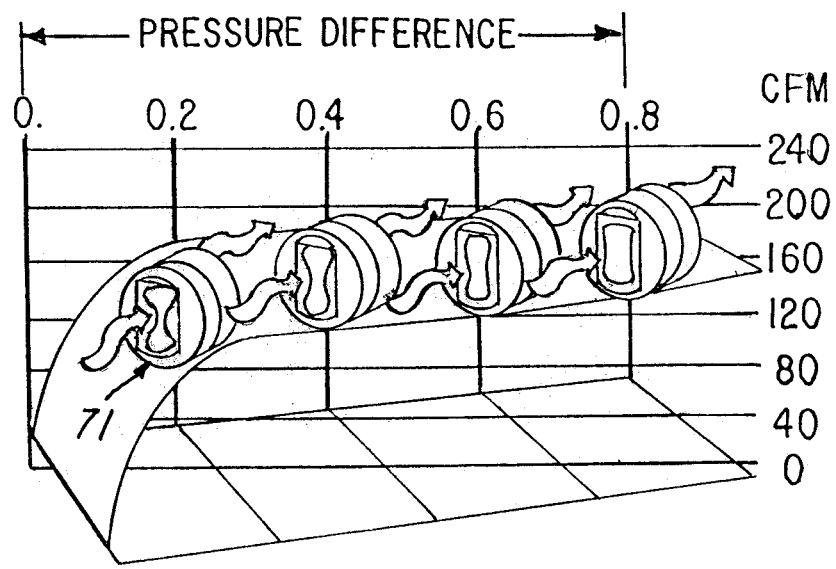
FIGS. 10A-10B show various characteristic curves of a prior art constant airflow regulator and a prior art bulb-type controller or regulator (FIG. 10A) and a vain-type controller or regulator (FIG. 10B)
Figure 10B:
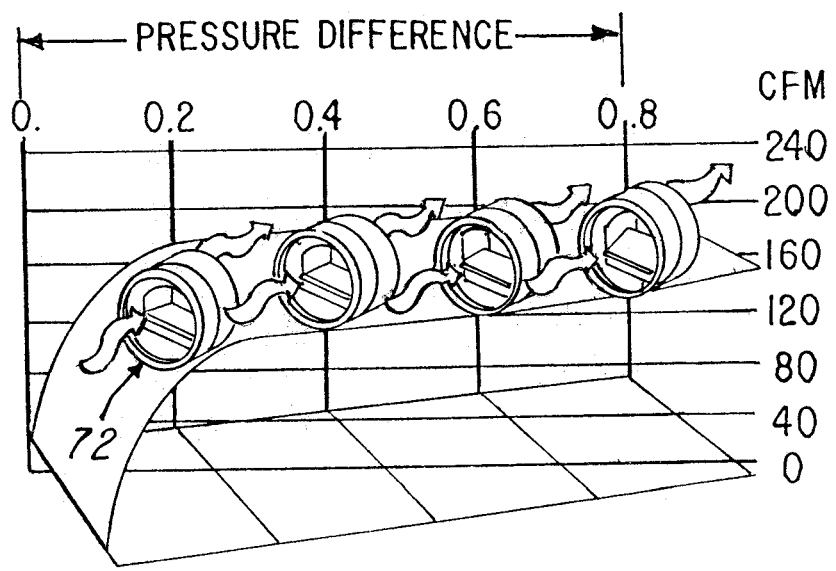

It should be understood that the constant airflow regulators 72 and 74 may comprise different specifications in a preferred embodiment and they both provide constant airflow regulation. For example, the constant airflow regulators 72 and 74 provide constant airflow regulation by operation of the vane 72a (FIG. 4), which acts to at least partially close the opening 59 (FIG. 5) in a manner conventionally known. In contrast, the constant airflow regulators 71 and 73 (FIG. 6) provide constant airflow regulation by the inflating action of the constant airflow regulator bulb 71a and 73a, respectively, and in a manner that is conventionally known. As illustrated in FIG. 6, note that the bulbs 71a and 73a are generally hour-glass shaped. As a static pressure increases in the ducts 18, the static pressure around the bulbs 71a and 73a increases, thereby causing the bulbs 71a and 73a to inflate and thereby decreasing the area around the bulbs 71a and 73a. At substantially the same time, as the static pressure around the bulbs 71a and 73a increases, an air velocity also increases thereby resulting in constant airflow. The constant airflow regulators 71, 72, 73 and 74 thereby provide a generally or substantially constant airflow regardless of pressure differences in the system 10. FIGS. 10A and 10B graphically illustrate the operative characteristics of the airflow regulators 71, 72, 73 and 74. It should be understood that the associated specifications will change depending upon the specifications selected by the user. The operation of the system 10 will now be described relative to several illustrative examples shown in FIGS. 7A-9B. For ease of illustration, the embodiment of FIGS. 7A-7B will be illustrated or used in the embodiment of FIG. 1, FIGS. 8A-8B will be illustrated as used in the embodiment of FIG. 2, and FIGS. 9A-9B will be illustrated as used in the embodiment of FIG. 3.

In the embodiments shown in FIGS. 7A-9B, the damper 58 provides primary airflow regulation or control. The damper 58 is used in combination with at least one of either the first or second regulator 72 or 74 as illustrated in FIGS. 7A-9B. In embodiments shown in FIGS. 9A-9B, the constant airflow regulator 74 permits a predetermined amount of airflow and provides substantially constant airflow regulation to a predetermined or maximum airflow rate. In contrast, the airflow regulator 72 in the illustration of FIGS. 8A-8B provides substantially constant airflow regulation at a predetermined amount or a minimum amount of airflow. When the regulators 72 and 74 are used together as illustrated in FIGS. 7A-7B, they control or regulate airflow to both a minimum and maximum level, respectively, while the damper 58 controls or regulates airflow to a primary demand level, such as an airflow level required to provide increased ventilation to a room in response to a demand signal from a user.

Typical airflow versus pressure difference characteristics are graphically illustrated by the graphs under each terminal 22 in FIGS. 7A-9B. It should be understood that the minimum amount of airflow rate and maximum of airflow rate will be dependent upon the size and specifications of the airflow regulators 71, 72, 73, and 74, respectively, selected. The user's selection of the appropriate constant airflow regulator 71-74 will depend on the environment or application in which the system 10 is being used. In one illustrative embodiment shown in FIGS. 7A-7B, the minimum airflow rate may be on the order of at least 10 cubic feet per minute ("CFM") and the maximum amount of airflow rate may be less than or equal to approximately 400 CFM, but this will be different depending on the application.

Returning to FIG. 5, note that the damper 58 is comprised of a generally circular planar member 58b lying in a first plane P1 when the damper 58 is in the closed position illustrated in FIG. 6. After the constant airflow regulator 72 is received in the area 59 defined by wall 58d (FIG. 4) of the planar member 58b, the constant airflow regulator 72 lies in the first plane P1 or directly in the airflow path of air flowing into the opening 32 (FIG. 4) of housing 24. When the damper 58 is in the closed position shown in FIGS. 5 and 6, the constant airflow regulator 72 regulates, permits or controls the airflow to the constant rate as dictated by the specifications for the constant airflow regulator 72 selected by the user. Thus, it should be understood that when the damper 58 is actuated from the closed position to the open position (illustrated in phantom in FIG. 5 and in the illustration of FIGS. 7A-7B and 8A-8B), the airflow regulator 72 is removed from the airflow path, thereby removing the minimum or constant airflow regulator from the opening 32 and from the airflow path between the area 14 and the duct 18.

It should be understood that one or both of the constant airflow regulators 72 and 74 may be used in various combinations, such as the illustrative combinations that will now be described relative to FIGS. 7A-9B. It should be understood that the illustrations in FIGS. 7A-9B show the damper assembly 40 (FIG. 4) and generally U-shaped member 42 removed from the housing 24 for ease of illustration.

In the embodiment shown in FIGS. 7A-7B, the constant airflow regulator 72 is situated in each damper 58 associated with each of the zones or areas 14. The constant airflow regulator 74 is situated in each duct 18 as shown. In the illustration in FIGS. 7A-7B, the fan 16 runs continuously at a first fan speed to provide constant ventilation airflow at a first rate. As illustrated in FIG. 7A, as air flows from the zones or areas 14 into the ducts 18, the air flows both through the constant airflow regulator 72 and constant airflow regulator 74. As exhaust air from fan 16, for example, is pulled from each zone or area 14 through the duct 18, the constant airflow regulator 72 provides constant airflow regulation to the first predetermined or minimum level. When there is a call or demand for increased ventilation in a remote area 14, such as when the user in one area 14 actuates the switch 54 to the on position as illustrated in FIG. 7B, the damper 58 in the demand area 14 is driven by motor 52 to the open position. The fan 16 senses the demand and causes increase in speed to a second fan speed. The dampers 58 in the other remote areas 14 remain closed, as shown by the two leftmost airflow regulators 72 shown in FIG. 7B. These regulators 72 provide constant airflow control or regulation to the first predetermined or minimum level dictated by the specifications of those constant airflow regulators 72. Notice that the increase in airflow through those constant airflow regulators 72 causes vanes 72a (FIG. 4) to partially close as shown in FIG. 7B, thereby controlling or regulating airflow to the desired rate. Substantially simultaneously, notice in the right-hand portion of FIG. 7B that the constant airflow regulator 72 in the damper 58 has been actuated to the open position and removed from the airflow path, thereby permitting increased airflow into and through the duct 18 from the area 14 as shown. The second constant airflow regulator 74 controls or regulates airflow to the second predetermined maximum level, while the constant airflow regulators 72 associated with the other zones or areas 14 control or regulate airflow to the first or minimum level.

Thus, the system 10 in the embodiments in FIGS. 7A-7B provides means for regulating or controlling airflow to the first predetermined or minimum flow rate in non-demand areas or zones 14 and between the first predetermined or minimum rate and the second predetermined or maximum rate during demand periods in demand zones or areas 14. In other words, the constant airflow regulator 72 in FIGS. 7A-7B facilitate controlling or regulating airflow to a substantially constant predetermined or minimum rate through each of the ducts 18. During ventilation demand periods in those demand areas 14 where there is a demand for increased ventilation, such as when a user activates switch 54, the damper 58 has been actuated to the open position. As illustrated by the rightmost assembly in FIG. 7B, at least one fan 16 or ventilator 17 responds to the pressure drop and increases fan speed, causing increased airflow at the increased or demand rate in response thereto. This causes increased ventilation from the area 14 where increased ventilation is demanded and through duct 18 and, ultimately, to the exhaust duct 19 associated with the building 12. Substantially simultaneously, the constant airflow regulator 72 in the two leftmost ducts (when viewed from left to right in FIG. 7B) regulate and control the airflow through the ducts 18 and so that airflow continues at substantially the constant rate up to the minimum airflow rate which is dictated by the constant airflow regulator 72 selected. The airflow in the system 10 is graphically illustrated by the graph under each of the regulators 72 and 74.

When the damper 58 in FIGS. 7A-7B is closed, the constant airflow regulators 72 or 74 that have the lowest maximum airflow specification will limit or regulate the maximum airflow to that specification. For example, if the constant airflow regulator 72 in FIG. 7A permits a maximum 10 CFM, while constant airflow regulator 74 permits a maximum airflow of 50 CFM, the airflow will be regulated to 10 CFM in the illustration shown in FIG. 7A when the damper 58 is in the closed position. When one of the dampers 58 in the system 10 is opened, the constant airflow regulator 72, mounted in the damper, is removed from the airflow path into opening 32 (FIG. 4), thereby permitting airflow at greater than 10 CFM. As the fan 16 or ventilator 17 cause airflow to increase, the regulator 74 regulates airflow through the duct 18 up to the maximum 50 CFM rate mentioned earlier. The airflow versus pressure characteristic is graphically illustrated by the graphs associated with the dampers 58 shown in FIGS. 7A-7B.

Referring back to FIGS. 9A and 9B, another illustrative embodiment is shown. In this embodiment, the regulator 74 is situated in the duct 18, but regulator 72 is not in the damper 58. In this embodiment the damper 58 and wall 58b are solid and only regulator 74 is used. During normal operation when there is no call or demand for ventilation or exhaust the dampers 58 are solid, remain closed and no ventilation through the ducts 18, for example, is permitted. The fan 16 or ventilator 17 provide airflow or turn on in response to the user actuating switch 54 which causes motor 52 to drive damper 58 from the closed position to the open position. When there is a call or demand for exhaust, the user activates the switch 54 and damper 58 activates switch 62, as described earlier, to turn on the fan 16 or ventilator 17 to cause an increased airflow to a demand rate. The airflow in the two leftmost ducts shown in FIG. 9B are continued to be blocked by solid damper 58 in this embodiment. The rightmost open damper 58 in FIG. 9B is open, but regulator 74 controls or regulates airflow to the second predetermined or maximum rate mentioned earlier. The graphs associated with the dampers 58 illustrate the airflow versus pressure difference for this embodiment.

FIGS. 8A and 8B show another embodiment. In this illustration, the constant airflow regulator 74 has been removed from the system 10. The regulators 72 permit minimum flow rate into the ducts 18 when the dampers 58 are in the closed position. When one damper 58 is driven by motor 52 to the open position, as illustrated by the rightmost damper 58 in FIG. 8B, then unregulated airflow is permitted in the duct 18 associated with the open damper 58. The constant airflow regulators 72 in the other dampers 58 provide airflow control and regulation to the first predetermined or minimum level, as illustrated by the airflow versus pressure graphs in FIGS. 8A and 8B.

Comparing the embodiment of FIGS. 7A and 7B to the embodiment of FIGS. 8A and 8B, notice that the constant airflow regulator 72 associated with the rightmost duct 18 shown in FIG. 7B has been removed from the direct airflow path between the zone area 14 into the duct 18, thereby permitting an increased airflow through the duct 18. The second constant airflow regulator 74 in FIG. 7B limits the maximum amount of airflow through the duct 18 to the second predetermined amount or the maximum rate specified by that constant airflow regulator 74. Substantially simultaneously, the constant airflow regulator 72 associated with the two leftmost ducts 18 (as viewed in FIG. 7B) in the areas or zones 14 where ventilation is not demanded continue to limit the amount of airflow to the minimum level amount. In this regard, notice that the vanes 72a associated with the two leftmost ducts have closed slightly, thereby limiting the airflow to the specification of those constant airflow regulators 72.

In contrast, the embodiment in FIGS. 8A and 8B does not utilize the regulators 74. Therefore, air flows unregulated into and through the duct 18 associated with the damper 58 in the area or zone 14 where ventilation is demanded. No maximum airflow control or regulation is provided in the duct 18 associated with that open damper 58.

Thus, it should be understood that the system 10 may be provided with one or more constant airflow regulators 72 and 74 in various combinations and arrangements with damper 58 that is solid or that has a regulator 72 mounted therein to regulate or control airflow to a substantially constant minimum and/or maximum level in the areas 14. On demand, the damper 58 may be actuated from the closed to the open position when the user desires to have increased airflow, such as ventilation airflow, in the zone or area 14, such as a bathroom.

It should be understood that the regulators 71-74 and features of the various embodiments in FIGS. 7A-9B may be mixed or interchanged and provided in a single system. One illustrative combination is shown in FIGS. 12A-12B. For example, a system 10 may have dampers 58 with regulators 71 or 72, with or without regulators 73 and 74. Some dampers 58 may be provided with the solid planar member 58b and without an opening 59 similar to the dampers in FIG. 9B, while other dampers 58 and regulators 72 and 74 may be provided as in the illustrations shown in FIGS. 7A-8B.

As mentioned earlier, it should be understood that while the system 10 and method have been shown utilizing the switch 54 that may be actuated by the user, other means for energizing and actuating the motor 52 to drive the damper 58 from the closed position to the open position may be used. For example, the system 10 may utilize any suitable means for providing a motor control signal for controlling the motor 52, such as the switch 54, a dehumidistat or occupancy sensor that senses when an occupant has entered or left a room, a timer, a $CO_2$ sensor, or any combination of the aforementioned means.

Advantageously, one feature of the embodiments illustrated is that it provides ventilation airflow regulation or control from the zones or areas 14 through at least one or a plurality of the ducts 18 to a maximum airflow rate or less or between minimum and maximum airflow rates. Note that the step of permitting airflow from the fan 16 or ventilator 17 is performed passively utilizing one or more of the constant airflow regulators 72 or 74.

Advantageously, the aforementioned embodiments provide a primary flow controller or regulator in the form of the damper 58 and at least one or a plurality of other flow controllers or regulators, such as the constant airflow regulators 71 and 72. These airflow regulators may be used alone or in combination with another constant airflow regulator 73 or 74.

As mentioned earlier, one advantage of the embodiment of FIGS. 4-6 is that maintenance is much improved over prior art systems because the assembly 40 can be completely removed from the housing 24 without having to disconnect the housing 24 or terminal 22 from any ducts or shafts. It should also be understood that the constant airflow regulators 71-74 require little or no routine maintenance, unlike the electrical and mechanical systems of the past.

The housing 24 does not have to be disconnected from the duct 18 if it is necessary to make any repairs or maintenance. The flow control device, such as regulators 72 and 74, require no direct electrical or pneumatic power source, and can regulate and control the airflow by utilizing only system duct pressure. Thus, even if there is no power to switch 54 or motor 52, the regulators 72 and/or 74 will continue to regulate airflow.

Another feature of one embodiment is the small size of the terminal 22, which has dimensions of 10"×10"×8". The terminal 22 is capable of being mounted between floor, and ceiling assemblies, such as those constructed of standard joists on 16" centers.

Because the system 10 is capable of regulating and controlling airflow in the various zones or areas 14 on an as needed basis, the overall capacity requirements of the central fan 16 and/or ventilator 17 can be reduced because the system 10 is capable of providing constant airflow in non-demand areas 14 and airflow at a demand rate in those areas where increased airflow or ventilation is demanded. This enables a smaller fan 16 or ventilator to be utilized in the system 10.

The system 10 advantageously provides a flow control device that regulates airflow to constant levels when exposed to varying duct pressure.

While the method herein described, and the form of apparatus for carrying this method into effect, constitute preferred embodiments of this invention, it is to be understood that the invention is not limited to this precise method and form of apparatus, and that changes may be made in either without departing from the scope of the inventions, which is defined in the appended claims.

What is claimed is:

1. A damper assembly for use in a ventilation system having an airflow generator, a terminal associated with an area to be ventilated, and a duct for coupling the airflow generator to the terminal, said damper assembly comprising:
    a support;
    a damper pivotally coupled to said support; and
    a motor mounted on said support for driving said damper between a closed position and an open position;
    wherein said terminal comprises a plurality of walls that cooperate to define a terminal area, said terminal area being adapted and sized to receive said damper assembly so that said damper assembly is housed in said terminal and may be accessed and serviced while in said terminal;
    wherein at least one passive airflow regulator is located in at least one of said damper or said duct, said at least one passive airflow regulator passively regulating airflow by responding to changes in airflow or pressure conditions within said at least one of said damper or said duct to maintain at least one predetermined airflow rate therein;
    wherein said at least one passive airflow regulator is completely contained or housed within at least one of: (i) said damper or (ii) said duct having said damper so that no operable or moving components of said at least one passive airflow regulator are situated outside (i) said damper or (ii) said duct, respectively;
    said damper assembly being detachably secured and removable from the system without dismantling or disconnecting either the duct or the terminal.

2. The damper assembly as recited in claim 1 wherein said at least one passive airflow regulator comprises at least one constant airflow regulator that is mounted in at least one of said damper or said duct.

3. The damper assembly for use in a ventilation system as recited in claim 1, wherein the damper assembly performs a method for maintaining a substantially constant airflow in the ventilation system having said duct, said method comprising the steps of:
    passively regulating airflow at a first rate through said duct; and
    causing airflow through said duct at a second rate in response to a demand signal as said airflow through the other of said duct continues to flow at said first rate.

4. The damper assembly as recited in claim 3 wherein said method further comprises the steps of:
    using a motor-driven damper and said at least one passive airflow regulator to perform said first passively regulating step.

5. The damper assembly as recited in claim 3 wherein said method further comprises the step of:
    situating at least one passive constant air regulator as said at least one passive airflow regulator in said duct to permit airflow at said first rate.

6. The damper assembly as recited in claim 4 wherein said method further comprises the step of:
    situating said at least one passive airflow regulator in said motor-driven damper to permit airflow at said first rate.

7. The damper assembly as recited in claim 3 wherein said method further comprises the step of:
    regulating airflow through said duct to a maximum rate; wherein said second rate is less than or equal to said maximum rate.

8. The damper assembly as recited in claim 3 wherein said at least one passive airflow regulator comprises a first passive constant airflow regulator, said method further comprises the step of:
    using said first passive constant air airflow regulator situated in said damper associated with an opening of said duct to perform said first passively regulating step.

9. The damper assembly as recited in claim 3 wherein said method further comprises the step of:
    using said at least one passive airflow regulator situated in said duct to perform said first passively regulating step.

10. The damper assembly as recited in claim 3 wherein said at least one passive airflow regulator comprises a first passive constant airflow regulator and second passive constant airflow regulator, said method further comprises the step of:
    using said second passive constant airflow regulator situated in said duct to cause airflow to be less than or equal to a maximum airflow rate.

11. The damper assembly as recited in claim 8 wherein said at least one passive airflow regulator comprises said first passive constant airflow regulator and a second passive constant regulator, said method further comprises the step of:
    using said second passive constant airflow regulator situated in said duct to cause airflow to be less than or equal to a maximum airflow rate.

12. The damper assembly for use in a ventilation system as recited in claim 1, wherein said duct comprises a plurality of ducts and the damper assembly performs a method for controlling airflow through said plurality of ducts coupled to a ventilator, comprising the steps of:
    permitting airflow from said ventilator through at least one of said plurality of ducts at a substantially constant rate; and
    permitting airflow through said at least one of said plurality of ducts to an area at a demand rate that is greater than said substantially constant rate in response to a demand signal.

13. The damper assembly as recited in claim 12 wherein said first permitting step is performed passively.

14. The damper assembly as recited in claim 13 wherein said first permitting step is performed using a constant air regulator situated in an airflow path between said ventilator and said area.

15. The damper assembly as recited in claim 14 wherein said method comprises the steps of:
    removing said constant air regulator from said airflow path in response to said demand signal.

16. The damper assembly as recited in claim 12 wherein said method further comprises the step of:
    regulating airflow through said at least one of said plurality of ducts to be at a maximum airflow rate or less.

17. The damper assembly as recited in claim 16 wherein said regulating step is performed passively.

18. The damper assembly as recited in claim 17 wherein said regulating step is performed using a constant air regulator as said at least one passive airflow regulator situated in an airflow path between said ventilator and said area.

19. The damper assembly as recited in claim 16 wherein both said first permitting step and said regulating step are performed passively.

20. The damper assembly as recited in claim 16, wherein said at least one passive airflow regulator comprises a first constant airflow regulator and a second airflow regulator, wherein said first permitting step and said regulating step are performed using said first constant air regulator situated in said damper situated in an airflow path and said second constant airflow regulator situated in said at least one of said plurality of ducts, respectively.

21. The damper assembly as recited in claim 12 wherein said second permitting step is performed by actuating said damper from a closed position during which airflow is at said substantially constant rate to an open position where airflow is at said demand rate.

22. The damper assembly as recited in claim 15 wherein said second permitting step is performed by actuating said damper from a closed position during which airflow is at said substantially constant rate to an open position where airflow is at said demand rate.

23. The damper assembly as recited in claim 12 wherein both said permitting steps are performed when pressure varies in said plurality of ducts.

24. The damper assembly for use in a ventilation system as recited in claim 1, wherein the damper assembly performs a method for providing zone-by-zone airflow regulation for regulating airflow to substantially constant levels, comprising the steps of:
controlling airflow substantially constant through a plurality of said terminals associated with areas, respectively, where either minimal or no ventilation airflow is demanded at a first rate; and
controlling airflow through said terminal at a second rate, which is higher than said first rate in areas where ventilation airflow is demanded in response to an airflow demand at a demand rate.

25. The damper assembly as recited in claim 24, wherein said at least one passive airflow regulator comprises at least one constant airflow regulator, wherein said controlling steps are effected using said damper in combination with said at least one constant airflow regulator.

26. The damper assembly as recited in claim 25 wherein said at least one passive airflow regulator comprises a plurality of constant airflow regulators are used with said damper.

27. The damper assembly for use in a ventilation system as recited in claim 1, wherein said at least one passive airflow regulator comprises at least one constant airflow regulator, wherein the damper assembly performs a method for regulating airflow to a plurality of zones of a building having a fan, comprising the steps of:
situating a primary passive airflow regulator in operative relationship with each of said plurality of zones to regulate airflow between each of said plurality of zones and said fan; and
situating at least one constant airflow regulator in operative relationship with each of said primary passive airflow regulators in order to regulate airflow between each of said plurality of zones and said fan such that when said primary passive airflow regulator permits a demand airflow between one of said plurality of zones and said fan, said at least one passive airflow regulator controls or regulates airflow such that airflow to at least the other of said plurality of zones is substantially constant.

28. The damper assembly as recited in claim 27 wherein said at least one constant airflow regulator is coupled to said primary passive airflow regulator.

29. The damper assembly as recited in claim 28 wherein said primary passive airflow regulator is said damper.

30. The damper assembly as recited in claim 28 wherein said method further comprises the step of:
providing said primary passive airflow regulator in the form of said damper having an aperture therein and said at least one constant airflow regulator is situated in said aperture.

31. The damper assembly as recited in claim 27 wherein said primary passive airflow regulator is a damper and said at least one constant airflow regulator is situated in at least one conduit operatively associated with said damper and that provides said at least one conduit between each of said plurality of zones and said fan.

32. The damper assembly as recited in claim 28 wherein said at least one passive airflow regulator comprises at least one constant airflow regulator, wherein said at least one constant airflow regulator comprises a first constant airflow regulator and a second constant airflow regulator, said duct having at least one conduit coupling said fan to each of said plurality of zones, said method further comprising the steps of:
causing airflow between one of said plurality of zones where airflow to a demand level is demanded and said fan using said primary passive airflow regulator;
regulating airflow to substantially constant level in the other of said plurality of zones where increased ventilation to said demand level is not demanded using at least one of a first constant airflow regulator in said damper or a second constant airflow regulator in said at least one conduit between said damper and said fan.

33. The damper assembly as recited in claim 32 wherein method further comprises the steps of:
using said first constant airflow regulator to regulate airflow to a first minimum level in said other of said plurality of zones;
using said second constant airflow regulator to regulate airflow between said plurality of zones where airflow to said demand level is demanded and said fan.

34. The damper assembly as recited in claim 33 wherein said first constant airflow regulator and said second constant airflow regulator are passive regulators having different flow specifications.

35. The damper assembly for use in a ventilation system as recited in claim 1, wherein said at least one passive airflow regulator comprises at least one of a primary, secondary or tertiary constant airflow regulator, wherein the damper assembly performs a method for regulating airflow to a substantially constant level in each of a plurality of zones in a structure, said structure comprising said airflow generator and at least one conduit for providing fluid communication between each of said plurality of zones and said airflow generator, said method comprising the steps of:
causing airflow to a demand level in any of said plurality of zones where airflow to said demand level is demanded; and
regulating airflow to a substantially constant level in the other of said plurality of zones where airflow to a demand level is not demanded.

36. The damper assembly as recited in claim 35 wherein said causing step comprises the step of:
situating said primary constant airflow regulator between each of said plurality of zones and said airflow generator, said primary constant airflow regulator permitting airflow to said demand level when demanded.

37. The damper assembly as recited in claim 35 wherein said regulating step further comprises the step of:
situating said primary constant airflow regulator between each of said plurality of zones and an opening in said at least one conduit.

38. The damper assembly as recited in claim 36 wherein said regulating step further comprises the step of:

situating said secondary constant airflow regulator in said primary constant airflow regulator to perform said regulating step.

39. The damper assembly as recited in claim 36 wherein said primary constant airflow regulator comprises said damper having an aperture therein for receiving said secondary constant airflow regulator; said regulating step further comprises the step of:

situating said secondary constant airflow regulator in said primary constant airflow regulator so that said secondary constant airflow regulator performs said regulating step when said damper is in a closed position.

40. The damper assembly as recited in claim 38 wherein said secondary constant airflow regulator regulates airflow to a first predetermined level, said method further comprising the step of:

situating said tertiary constant airflow regulator in said at least one conduit between each of said plurality zones and said airflow generator to regulate airflow to each of a plurality of conduits to a second predetermined level.

41. The damper assembly as recited in claim 40 wherein said at least one conduit comprises a plurality of ducts coupled to said airflow generator and said first constant airflow regulator regulates airflow to said first predetermined level, said method further comprising the step of:

situating said tertiary constant airflow regulator in each of said plurality of ducts and between said primary regulator and said airflow generator to regulate airflow to a second predetermined level.

42. The damper assembly as recited in claim 36 wherein said regulating step further comprises the step of:

situating said tertiary constant airflow regulator between said primary constant airflow regulator in each of said plurality of zones and said airflow generator to perform said regulating step after said primary constant airflow regulator permits airflow to said demand level.

43. The damper assembly as recited in claim 41 wherein said primary constant flow regulator is a solid damper that is actuated from a closed position to an open position when airflow to said demand level is demanded.

44. The damper assembly as recited in claim 43 wherein said damper actuates a switch to energize said airflow generator when said damper is driven to said open position.

45. The damper assembly as recited in claim 36 wherein said causing step comprising the step of:

using a continuously operating fan that generates airflow at a non-demand airflow level when airflow at a demand level is not demanded and automatically generates airflow to said demand level when said primary constant airflow regulator permits airflow at said demand level.

* * * * *

UNITED STATES PATENT AND TRADEMARK OFFICE
CERTIFICATE OF CORRECTION

PATENT NO. : 10,571,140 B2
APPLICATION NO. : 14/947280
DATED : February 25, 2020
INVENTOR(S) : Dietz et al.

Page 1 of 1

It is certified that error appears in the above-identified patent and that said Letters Patent is hereby corrected as shown below:

In the Claims

Column 14, Line 16, Claim 10, insert -- a -- after "regulator and".
Column 14, Line 25, Claim 11, insert -- airflow -- after "constant".
Column 18, Line 13, Claim 43, delete "flow" and insert -- airflow -- therefor.

Signed and Sealed this
Thirty-first Day of March, 2020

Andrei Iancu
*Director of the United States Patent and Trademark Office*